(12) United States Patent
Asaro et al.

(10) Patent No.: US 12,105,623 B2
(45) Date of Patent: Oct. 1, 2024

(54) VIRTUALIZED INPUT/OUTPUT DEVICE LOCAL MEMORY MANAGEMENT

(71) Applicant: ATI TECHNOLOGIES ULC, Markham (CA)

(72) Inventors: Anthony Asaro, Markham (CA); Philip Ng, Markham (CA); Jeffrey G. Cheng, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 16/225,608

(22) Filed: Dec. 19, 2018

(65) Prior Publication Data
US 2020/0201758 A1 Jun. 25, 2020

(51) Int. Cl.
| G06F 12/02 | (2006.01) |
| G06F 12/1045 | (2016.01) |
| G06T 1/20 | (2006.01) |
| G06T 1/60 | (2006.01) |

(52) U.S. Cl.
CPC ...... *G06F 12/0292* (2013.01); *G06F 12/1054* (2013.01); *G06T 1/20* (2013.01); *G06T 1/60* (2013.01); *G06F 2212/1044* (2013.01); *G06F 2212/657* (2013.01)

(58) Field of Classification Search
CPC ......... G06T 1/60; G06T 1/20; G06F 12/0292; G06F 12/1054; G06F 2212/657; G06F 2212/1044
See application file for complete search history.

(56) References Cited

U.S. PATENT DOCUMENTS

| 5,497,476 | A | * | 3/1996 | Oldfield | G06F 3/0601 |
| | | | | | 711/201 |
| 6,128,711 | A | * | 10/2000 | Duncan | G06F 12/0835 |
| | | | | | 711/119 |
| 7,334,108 | B1 | * | 2/2008 | Case | G06F 12/1045 |
| | | | | | 710/26 |
| 10,552,309 | B2 | * | 2/2020 | Gschwind | G06F 12/109 |
| 2015/0091912 | A1 | * | 4/2015 | Swoboda | G06T 1/20 |
| | | | | | 345/505 |
| 2016/0062912 | A1 | * | 3/2016 | Heideman | G06F 13/28 |
| | | | | | 710/26 |
| 2017/0123735 | A1 | * | 5/2017 | Hom | G06F 3/0608 |
| 2018/0130171 | A1 | * | 5/2018 | Prakash | G06T 1/20 |
| 2018/0349288 | A1 | * | 12/2018 | Vakharwala | G06F 12/1475 |
| 2019/0042329 | A1 | * | 2/2019 | Kakaiya | G06F 9/5088 |
| 2020/0004688 | A1 | * | 1/2020 | Brigg | G06F 12/023 |
| 2020/0192691 | A1 | * | 6/2020 | Jiang | G06F 12/109 |

* cited by examiner

*Primary Examiner* — Zhuo H Li

(57) ABSTRACT

An apparatus includes a graphics processing unit (GPU) and a frame buffer. The frame buffer is coupled to the GPU. Based upon initialization of a virtual function, a plurality of pages are mapped into a virtual frame buffer. The plurality of pages are mapped into the virtual frame buffer by using a graphics input/output memory management unit (GIOMMU) and an associated page table.

20 Claims, 4 Drawing Sheets

VIRTUALIZED INPUT/OUTPUT DEVICE LOCAL MEMORY MANAGEMENT

BACKGROUND

Today's computer systems use virtualization to allow the sharing of physical resources of a host system between different virtual machines (VMs). VMs are software abstractions of physical computing resources that emulate an independent computer system, thereby allowing multiple operating system environments to exist simultaneously on the same computer system. The host system allocates a certain amount of its physical resources to each of the VMs so that each VM is able to use the allocated resources to execute applications, including operating systems (referred to as "guest operating systems").

An example of a physical resource that is allocated to VMs is a frame buffer. A frame buffer may be considered private memory which is used by graphical processing units (GPUs) to store data for the visualization of images and other computational processing tasks. For GPUs that utilize VFs and VMs for system virtualization, the partitioning of the frame buffer between VFs usually occurs at boot time or during VF assignment to the VM. During the partitioning process, each VF receives a contiguous region of frame buffer memory. However, the initial partitioning of the frame buffer may not be appropriate since VFs are constantly removed and reassigned to different VMs. That is, the allocation of memory that occurs during the initial partitioning is problematic because it is generally not possible to deallocate the virtual functions and recreate a virtual function with an increased amount of memory. For example, if there are initially three virtual functions, VF1, VF2, and VF3, with equal and adjacent framebuffer memory, it is not possible to deallocate VF1 and VF3 and re-create VF1 with twice the amount of memory. The inability to deallocate the virtual functions and the corresponding frame buffer memory results in a GPU that is not able to fully maximize the use of frame buffer memory. Thus, an improved technique for allocating frame buffer memory is needed.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate a processing system configured to employ techniques for generating a virtual frame buffer. In typical graphical processing units (GPUs), which utilize virtual functions (VFs) and virtual machines (VMs) for system virtualization, in order to support the sending and receiving of data between the VMs and the frame buffer attached to the GPU, the VMs and their corresponding VFs are typically assigned contiguous ranges of memory in the frame buffer for data transfer. In addition, frame buffer memory is also used by the VF as part of its data processing, such as, for example, drawing 3D graphics or performing various computations. The VMs generally request varying sizes of frame buffer memory and as a result, there is often times not enough contiguous memory to allocate to the VM for larger frame buffer memory requests because the frame buffer memory has been allocated in smaller varying sizes of memory that are not aligned. The varying sizes of memory that are allocated results in fragmentation of the frame buffer, where the entire frame buffer cannot be fully utilized by the virtual machines and is therefore wasted. The processing system described herein is used to rectify the fragmentation issue that arises when memory is accessed contiguously. In various embodiments, a virtual buffer generation technique is used to generate pages that are virtually concatenated to yield a virtual frame buffer. In various embodiments, a virtualized frame buffer is generated where the virtualized frame buffer is composed of a plurality of virtual frame buffers. To the VMs that are requesting memory access to the frame buffer, the allotted memory allocation appears contiguous even though the memory in the frame buffer may be provided non-contiguously.

Figure 1:
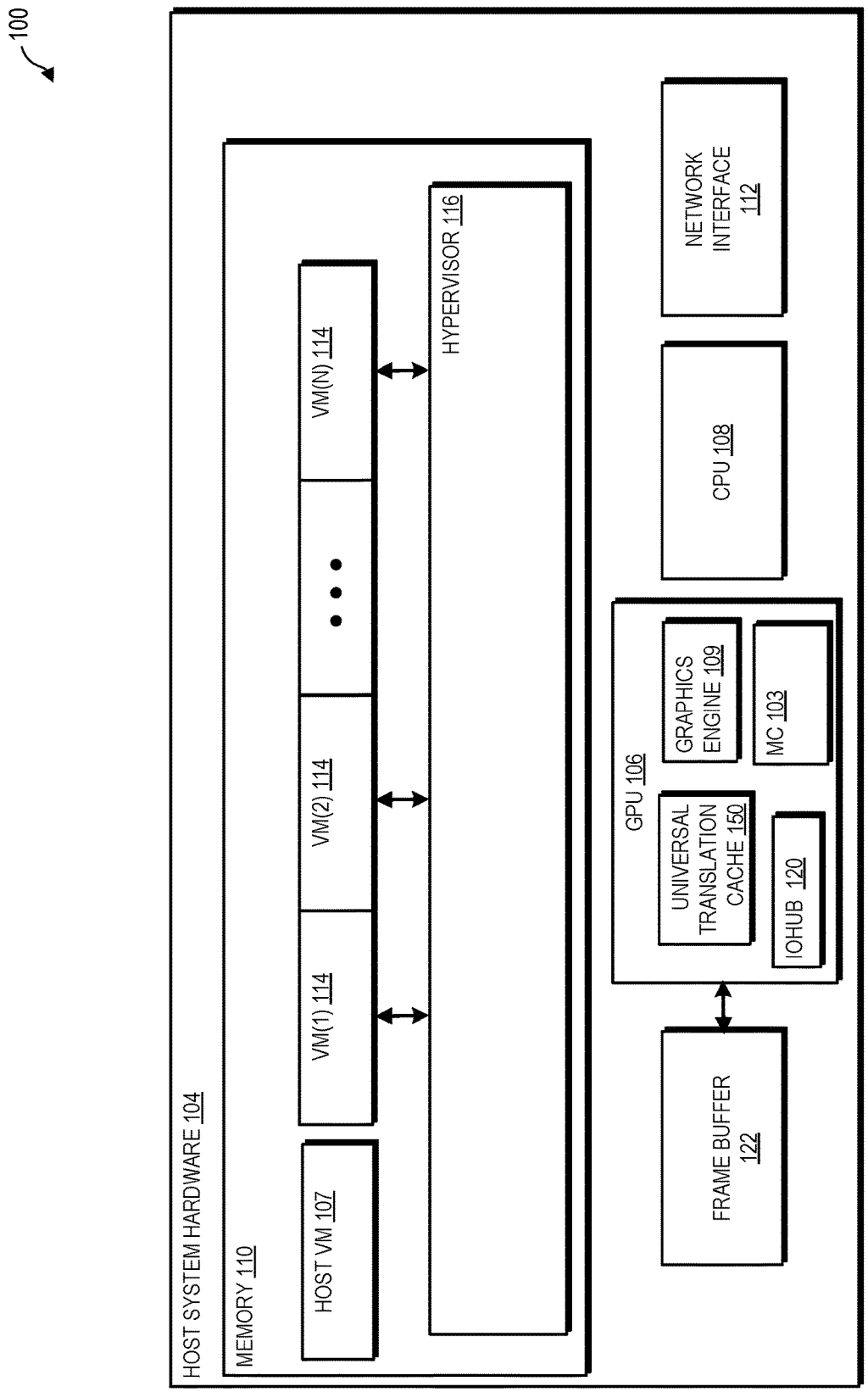
FIG. 1 is a block diagram of a processing system for hosting virtual machines in accordance with some embodiments.

FIG. 1 is a block diagram of a processing system 100 for hosting virtual machines in accordance with some embodiments. The processing system 100 includes a host system hardware 104. Host system hardware 104 includes a graphics processing unit (GPU) 106 (e.g., a graphics card or graphics processor), a central processing unit (CPU) 108, a memory 110, a network interface controller 112, and a frame buffer 122. The GPU 106 is a graphics rendering device for rendering a computer graphics frame for eventual display. The CPU 108 is a microprocessor or a microcontroller and generally facilitates input/output processing, application software, drivers, display creation and virtualization management. The memory 110 includes any permanent or volatile memory capable of storing data and instructions. The host system 102 is coupled to one or more remote clients (not shown) over a network via the network interface controller 112.

In the example processing system 100 of FIG. 1, multiple virtual machines (VMs) 114 are configured in memory 110 on the host system 102. Resources from physical devices of the host system 102 are shared with the VMs 114. The resources include, for example, a graphics processor resource from GPU 106, a central processing unit resource from CPU 108, a memory resource from memory 110, a network interface resource from network interface controller 112, or the like. The VMs 114 use the resources for performing operations on various data (e.g., video data, image data, textual data, audio data, display data, peripheral device data, etc.). In one embodiment, the host system 102 includes a plurality of resources, which are allocated and shared amongst the VMs 114.

The processing system 100 also includes a hypervisor 116 that is configured in memory 110. The hypervisor 116 is also known as a virtualization manager or virtual machine manager (VMM). The hypervisor 116 controls interactions between the VMs 114 and the various physical hardware devices of the host system 102 (i.e., resources), such as the GPU 106, the CPU 108, the memory 110, and/or the network interface 112. The hypervisor manages, allocates, and schedules resources that include, but are not limited to, CPU processing time or order, GPU processing time or order, memory, bandwidth usage, and memory usage. In one embodiment, the hypervisor 116 comprises a set of processor-executable instructions in the memory 110 for adjusting the provisioning of resources from the hardware devices to the VMs 114 using a GPU scheduler 118 and a CPU scheduler 120.

In various embodiments, the generation of a virtualized frame buffer (depicted, for example, in FIG. 3) is based on the premise that the memory space allocated to the virtual machine of VMs 114 is scattered or divided into a plurality of pages, based on, for example, using a scatter gather method (described further below with reference to FIG. 2) or previous use of frame buffer 122 during typical frame buffer memory allocation or access. The locations of the pages are annotated by graphics input/output memory management unit (GIOMMU) that is located in IOHUB of GPU 106. GPU 106 includes a memory controller (MC) 103 and a graphics engine 109 that is bound to a guest VM in VMs 114.

During operation host system hardware 104, a request is made to initialize a virtual function (VF) for use by a VM of VMs 114. As is the case in typical memory allocation requests, the request includes a specific amount of memory that the VF seeks to access from frame buffer 122. To initiate the process of generating a virtual frame buffer, hypervisor 116 calls a GIOMMU driver located in host VM 107 to allocate the requested amount of memory. Using the GIOMMU driver, the host VM 107 identifies pages that are available within frame buffer 122 whose capacity yields the requested amount of frame buffer memory. To generate the virtual frame buffer, the GIOMMU driver located in host VM 107 constructs a page table mapping the pages into a virtual frame buffer available for use by graphics engine 109.

When graphics engine 109 intends to access framebuffer 122, graphics engine 109 sends a translation request to the universal translation cache (UTC) 150 with the virtual address (VA) of the corresponding memory in framebuffer 122, a guest virtual memory identification (VMID), and the virtual function identification (VFID). The UTC 150 uses a GPUVM located in UTC 150 to convert the VA to a guest physical address (GPA). In various embodiments, the VA to GPA translation may be controlled by the VM or driver software located within the VM. The GIOMMU located in IOHUB 130 converts the GPA to the true system physical address (SPA). In various embodiments, the GPA to SPA translation may be controlled by, for example, hypervisor 116 or a host VM of the hypervisor. The UTC 150 returns the SPA to graphics engine 109. At a later instance, graphics engine 109 makes a memory request to framebuffer 122 using the SPA. That is, VMs 114 themselves do not (typically) access framebuffer 122 directly, rather, VMs 114 command graphics engine 109 to perform computational operations using data from frame buffer memory 122. VMs 114 with assigned VFs will direct the graphics engine 109 to perform operations referencing GPAs. The GIOMMU will translate the GPAs into SPAs using page table based address translation. The guest physical pages are then accessed using the virtual frame buffer (shown in FIG. 3). The resulting virtual frame buffer appears as a contiguous frame buffer to the associated virtual function which is bound to the virtual machine.

Thus, GPU 106 is configured to generate a virtual frame buffer that allows virtual machines 114 to access memory in frame buffer 122 in a non-contiguous fashion. In various embodiments, because some of the pages may be scattered and non-contiguous and of a fixed or variable size (discussed further below with reference to FIG. 2), the pages are gathered and virtually concatenated from various locations of the allocated memory space in frame buffer 122 to generate the virtualized frame buffer. Using the virtualized frame buffer, GPU 106 is able to execute graphical operations on behalf of guest VMs (e.g., guest VMs 108) that reduce fragmentation of frame buffer 122 and create a virtualized frame buffer that appears contiguous even though the physical pages are scattered.

Figure 2:
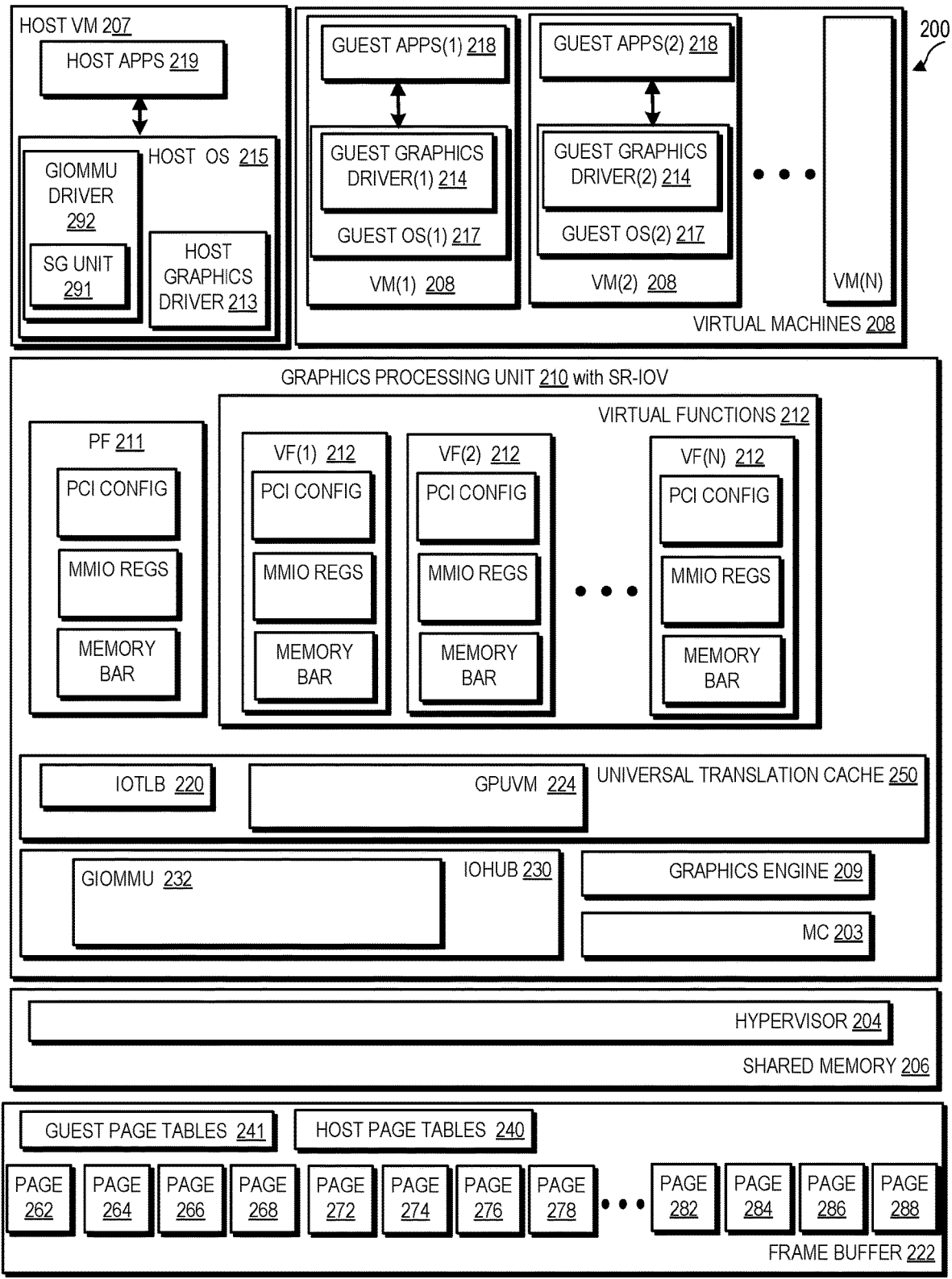
FIG. 2 is a block diagram illustrating a host system in accordance with some embodiments.

FIG. 2 is a block diagram illustrating an embodiment of a host system 200 that depicts the host system 102 of FIG. 1 in greater detail. As previously discussed, a hypervisor 204 is configured in shared memory 206 and runs on the host system 200 to initialize and manage instances of guest virtual machines (VMs) 208. Shared memory 206 facilitates the execution of tasks performed by GPU 210 by storing data used by GPU 210. Shared memory 206 can be random access memory (RAM), non-volatile memory such as non-volatile dual in-line memory module (NVDIMM), and the like, or a combination thereof. In some embodiments, the host system 200 is a centralized server that is partitioned into multiple VMs to provide virtual desktops to users.

Host system 200 includes a host virtual machine (VM) 207, VMs 208 (virtual machine (1) 208 through virtual machine(N) 208), a GPU 210, shared memory 206, and a frame buffer 222. Host VM 207 includes applications (APPS) 219 and host operating system (OS) 215. Host operating system 215 includes a host graphics driver 213 and a graphics input/output memory management unit (GIOMMU) driver 292. GIOMMU driver 292 includes a scatter gather unit 291. VM (1) 208 includes guest applications (APPS) 218 and a guest operating system (1) 217. Guest operating system (1) 217 includes a guest graphics driver (1) 214. Virtual machine (1) 208 includes guest applications (APPS) (1) 218 and guest operating system (1) 217. Guest operating system (1) 217 includes a guest graphics driver (1) 214. Virtual machine (2) 208 includes guest applications (APPS) (2) 218 and guest operating system (2) 217. Guest operating system (2) 217 includes a guest graphics driver (2) 214. GPU 210 includes a physical function 211, virtual functions 212, universal translation cache (UTC) 250, a memory controller (MC) 203, and input/output hub (IOHUB) 230. UTC 250 includes an input/output translation look-aside buffer (IOTLB) 220 and a GPUVM 224.

IOHUB 230 includes a graphics input/output memory management unit (GIOMMU) 232. In various embodiments, GIOMMU 232 is configured to remap the guest physical address to the system physical address. In various embodiments, GIOMMU 232 is configured to perform address translations for both the physical function (PF) 211 and virtual functions (VFs) 212 when accessing framebuffer memory 222. In various embodiments, the GIOMMU 232 may optionally be constructed as a separate Peripheral Component Interconnect Express (PCIe) function (described further below). That is, it may be a function in parallel with PF 211 where the function contains memory BAR and MMIO registers for the GIOMMU 232. In addition, GIOMMU 232 may also be configured to overcommit memory and page fault. For example, when VM (1) 208 attempts to access a GPA that is not mapped to a page, GIOMMU 232 will fault and notify host VM 207 of the fault. Host VM 207 can swap out a page belonging to VM (2) 208 and then map the free page to VM (1) 208. VM (1) 208 then runs using the mapped page.

Shared memory 206 includes a hypervisor 204. Frame buffer 222 includes host page tables 240, guest page tables 241 (GPUVM page tables 241), pages 262-268, pages 272-278, and pages 282-288 (hereinafter pages 262-268). In various embodiments, guest page tables 241 and host page tables 240 represent the page tables for GPUVM 224 and GIOMMU, respectively. In various embodiments, guest pages table 241 are GPUVM page tables that are in the scattered pages, similar to other guest VM data. In various embodiments, guest page tables 241 are contiguous. In various embodiments, the host page tables 240 are located in the non-paged region of memory. In various embodiments, the space reserved for the page tables may be, for example, 256 MB, 512 MB, or some other value depending upon design preferences. In various embodiments, GPUVM 224 and GIOMMU 232 are used to fetch guest page tables 241 and host page tables 240 respectively. In various embodiments, GPUVM 224 and GIOMMU 232 may also optionally cache portions of guest page tables 241 and host page tables 240. IOTLB 220 may cache address translations received from GIOMMU 232. In various embodiments, pages 262-288 refer to pages in frame buffer 222 that have been scattered (described in further detail below with reference to FIGS. 2 and 3) to generate a virtual frame buffer for use by virtual machines 208 and virtual functions 312.

The hypervisor 204 includes software components for managing hardware resources and software components for virtualizing or emulating physical devices (e.g., hardware of the host system 200) to provide virtual devices, such as virtual disks, virtual processors, virtual network interfaces, or a virtual GPU as further described herein for each virtual machine 208. In one embodiment, each virtual machine 208 is an abstraction of a physical computer system and may include an operating system (OS), such as Microsoft Windows® and applications, which are referred to as the guest OS and guest applications, respectively, wherein the term "guest" indicates it is a software entity that resides within the VMs.

The VMs 208 are generally instanced, meaning that a separate instance is created for each of the VMs 208. Although two virtual machines (e.g., VM (1) 208 and VM (2) 208) are shown, one of ordinary skill in the art will recognize that host system 200 can support any number of virtual machines. As illustrated, the hypervisor 204 provides two virtual machines, virtual machine (1) 208 and virtual machine (2) 208, with each of the guest virtual machines 208 providing a virtual environment wherein guest system software resides and operates. The guest system software comprises application software (APPS 214) and device drivers (graphics drivers 214), typically under the control of the guest OS 217. In some embodiments, the application software comprises a plurality of software packages for performing various tasks (e.g., word processing software, database software, messaging software, and the like).

In various virtualization environments of GPU 210, single-root input/output virtualization (SR-IOV) specifications allow for a single Peripheral Component Interconnect Express (PCIe) device to appear as multiple separate PCIe devices. A physical PCIe device of the host system 200 (such as graphics processing unit 210, shared memory 206, or a central processing unit 108 of FIG. 1) having SR-IOV capabilities is configured to appear as multiple functions (virtual functions 212). The term "function" as used herein refers to a device with access controlled by a PCIe bus. SR-IOV operates using the concepts of physical functions (PF) (e.g., physical function 211) and virtual functions (VFs) (e.g., virtual functions 212), where the physical functions are full-featured functions associated with the PCIe device. Virtual functions 212, however, are derived from physical function 211 and represent functions that lack configuration resources and only process input/output. Generally, each of the VMs 208 is assigned to a VF 212.

In the example embodiment of FIG. 2, the SR-IOV specification enables the sharing of graphics processing unit 210 among the virtual machines 208. The graphics processing unit 210 is a PCIe device having physical function 211. The virtual functions 212 are derived from the physical function of the graphics processing unit 210, thereby mapping a single physical device (e.g., the graphics processing unit 210) to a plurality of virtual functions 212 that is shared with guest virtual machines 208. In some embodiments, the hypervisor 204 maps (e.g., assigns) the virtual functions 212 to the guest virtual machines 208. For example, VF(1) 212 is mapped to VM(1) 208, VF(2) 212 is mapped to VM(2) 208, and so forth. The virtual functions 212 appear to the OS of their respective virtual machines 208 in the same manner as a physical GPU would appear to an operating system, and thus, the virtual machines 208 use the virtual functions 212 as though they were a hardware device.

Driver support for the virtual functions 212 is provided using, for example, guest graphics drivers 214 installed in the guest OS 217 of the virtual machines 208. In various embodiments, driver support for GIOMMU 232 is provided using GIOMMU driver 292 (and similarly GIOMMU driver 392 in FIG. 3) that allows for a logical separation of the software controlling PF 211 and software controlling the GIOMMU 232. That is, in various embodiments, GIOMMU driver 292 controls the GIOMMU 232, as opposed to graphics driver 213. As used herein, a device driver is a computer program based component that configures a machine and acts as a translator between a physical device and the applications or operating systems that use the device. A device driver typically accepts generic high-level commands and breaks them into a series of low-level, device-specific commands as required by the device being controlled. The guest graphics drivers 214 perform the same role as a typical device driver except that the guest graphics drivers 214 each control a virtual function 212 which are each, in turn, mapped to a VM 208. In various embodiments, graphic drivers 214 may also program the virtual functions 212 associated with virtual machines 208 with guest physical addresses (GPAs).

In various embodiments, GPU 210 is configured to generate a separate or individual virtual frame buffer for use by each virtual machine of virtual machines 208. GPU 210 implements the PCI SR-IOV specification and leverages GIOMMU 232, frame buffer 222, and IOTLB 220 of UTC 250 to generate virtual frame buffers for the virtual functions 212 in the SR-IOV virtualization environment. As stated previously, UTC 250 includes IOTLB 220 and a GPUVM 224. IOTLB 220 is a buffer located in GPU 210 that holds pretranslated addresses. An example of an IOTLB utilized in GPU 210 is a PCIe Address Translation Cache (ATC) or modified PCIe that is able to differentiate between system memory and frame buffer memory. GPUVM 224 represents the guest VM layer that uses the guest virtual address (GVA) and the virtual machine identification (VMID) for translation to a guest physical address (GPA). GPUVM 224 performs page table walks individually with GPUVM page tables 241 located in the guest VM portion of frame buffer 222 and distinct from the host page tables 240, also located in frame buffer 222. IOTLB 220 relies on GIOMMU 232 to fetch translations during translation requests from virtual machines 208.

Physical function 211 has its own PCI configuration, registers, and memory space. GPU 210 further includes one or more virtual functions 212. As stated previously, the virtual functions 212 are configured and assigned to a virtual machine by hypervisor 204 and appear to the virtual machine as having an individual GPU 210. Each virtual function of virtual functions 212 has its own registers and memory space in, for example, frame buffer 222. That is, each virtual function of virtual functions 212 includes memory-mapped input/output (MMIO) registers, PCI configuration space, and memory base address registers (BARs). In various embodiments, the base address for the portion of memory of frame buffer 222 associated with a memory request is represented by memory BAR (frame buffer memory BAR).

In various embodiments, scatter gather unit 291 represents the host layer and is located in GIOMMU driver 392 of host virtual machine 207. In various embodiments, SG unit 391 may be a control function that programs the page tables consumed by the GIOMMU 232. That is, in addition to controlling UTC 250, scatter gather unit 291 may be configured to control the scatter gather mapping of frame buffer 222. In various embodiments, scatter gather unit 291 is software that is configured to execute and control the scatter gather mapping of frame buffer 222. In various embodiments, scatter gather mapping is also known as graphics address relocation table (GART) mapping and for the GPU 210 shown in FIG. 2, allows GIOMMU 232, frame buffer 222, and IOTLB 220 to leverage a scattered plurality of pages to generate virtual frame buffers in a virtualized frame buffer for the virtual functions 212 in the SR-IOV virtualization environment. In various embodiments, upon instantiation of virtual function 212, scatter gather unit 291 scatters the memory space of frame buffer 222 using the scatter gather mapping technique into a plurality of pages. That is, in some embodiments, utilizing the scatter gather mapping technique, the memory space of frame buffer 222 is segmented into pages (pages 262-268, pages 272-278, and pages 282-288) of varying sizes.

In various embodiments, the scattering of frame buffer 222 may also occur due to the natural scattering of pages of memory in frame buffer 222 that takes place during the use of frame buffer 222 by, for example, VMs. That is, overtime, the use of portions of frame buffer 222 that have been accessed by VMs 208 may cause frame buffer 222 to have pages scattered throughout frame buffer 222.

In various embodiments, the size of the pages that are generated depend upon the size of the memory space typically utilized by a VM 208 that has previously requested memory from frame buffer 222. For example, the size of pages may be, 16 MB, 32 MB, 64 MB, or lesser or greater depending on the size of the frame buffers that are typically requested by VMs 208. In various embodiments, the size of the pages may be several possible power-of-2 page sizes, such as, for example, 1 GB, 2 MB and 4 KB. In various embodiments, the pages are distributed about the frame buffer 222 with GIOMMU 232 annotating the location of each page. The location of the scattered pages 262-268, pages 272-278, and pages 282-288 within frame buffer 222 are provided to host page tables 240 of frame buffer 222. In various embodiments, GIOMMU 232 keeps track of the pages so that for a memory allocation request corresponding to a specific size of memory in frame buffer 222, the location of the plurality of pages are known. In various embodiments, GIOMMU 232 keeps track of the pages so that for a memory access request corresponding to a specific translated physical address and physical address range, the location of the plurality of pages are known.

In various embodiments, in order to initiate the generation of the virtual frame buffer, a request is made by a user of host system 200 to create a virtual machine and provide an associated frame buffer allocation for processing. In various embodiments, the user may be a human entity and/or a software entity, such as, for example, orchestration software that seeks to utilize a virtual machine for specific processing purposes. Hypervisor 204 receives the request which triggers hypervisor 204 to initialize VFs 212 with the requested amount of memory from frame buffer 222. After the request is received by hypervisor 204 to initialize VFs 212, hypervisor 204 calls GIOMMU driver 292 to allocate the requested virtual frame buffer memory. GIOMMU driver 292 identifies the plurality of pages that are available whose memory capacity yield or sum up to the requested amount of memory. GIOMMU driver 292 constructs a GIOMMU host page table 240 mapping the available pages (e.g., pages 262-268, pages 272-278, or 282-288) into a guest physical address-contiguous virtual frame buffer of the requested size. Hypervisor 204 then assigns a VF 212 of VFs 212 to a VM 208 with the associated virtual frame buffer. In various embodiments, the virtual frame buffer includes an instance of host page tables 240 ((e.g., 369, 379, 389) referencing FIG. 3) that includes the mapping of the selected pages into the virtual frame buffer.

In various embodiments, in order to use the virtual frame buffer, graphics engine 209 issues a translation request to UTC 250 to translate a virtual address to a physical address. The translation request includes a guest virtual address (GVA), a guest virtual memory identification (VMID), and a virtual function identification (VFID). GPUVM 224, which is the guest VM layer, receives the translation request and uses the GVA and VMID for translation to a guest physical address. IOTLB 220 and GIOMMU 232, which in combination comprise the host VM layer, use the GPA and VFID for translation to the system physical address (SPA). Thus, UTC 250 translates the virtual address to a physical address (i.e., the physical address is the final location of the data to be stored in, for example, frame buffer 222) and provides the translated physical address to graphics engine 209. After GPUVM 224 and IOTLB 220 have completed the translation, graphics engine 209 uses the system physical address to generate a memory access request.

Graphics engine 209 receives the physical address provided by IOTLB 220 of UTC 250 and makes a memory access request to frame buffer 222 using the SPA. GPU 210 then utilizes the virtual frame buffer to fulfill the memory access request. By using the virtual frame buffer, the virtual machines accessing frame buffer 222 (i.e., VMs 208) are under the impression that they are accessing contiguous frame buffer memory of frame buffer 222, even though the VMs 208 may be accessing, for example, non-contiguous pages 262-268, 272-278, and 282-288, that formulate each virtual frame buffer or plurality of virtual frame buffers within a virtualized frame buffer.

In various embodiments, upon receipt of the memory request from graphics engine 209, the plurality of pages corresponding to the physical address of the received memory request are gathered upon request by the graphics engine 209. That is, the pages that correspond to the virtual address range are virtually concatenated to make up a segment or frame of each virtual frame buffer. The memory request corresponds to a range of virtual addresses that map to a range of physical addresses in frame buffer 222. The pages of the memory space in frame buffer 222 that correspond to the range of virtual addresses are used in the frame buffer 222 and used to service the memory access request. The pages allotted during the memory access request are located within the virtual frame buffer and yield the segment requested from the virtual frame buffer.

In addition to providing a virtual frame buffer that appears as a contiguous frame buffer to virtual machines 208, GPU 210 is also able to provide encryption to the pages provided to the virtual frame buffer. During instantiation of virtual functions 212, each virtual function 212 is provided a unique encryption key that is used during the encryption process to determine whether the page tables associated with the virtual frame buffer are to be encrypted. Thus, there is a bit in GPUVM page tables 241 that indicates whether a virtual machine 208 has elected to encrypt. After the translation is returned back to the client (i.e., a virtual machine of virtual machines 208) and the client makes a memory request, GIOMMU 232 attaches the associated virtual function ID to the memory request that is directed to memory controller 203 (i.e., frame buffer 222). The memory request is directed to MC 203 where MC 203 checks the bit and when the encryption bit is on, determines that the client has elected encryption for the particular page that is requested. MC 203 then performs the selected encryption for that particular page. The process is repeated for each page requested by the virtual machine during the memory request. Thus, memory controller 203 is used to implement the encryption capabilities described above for GPU 210.

Figure 3:
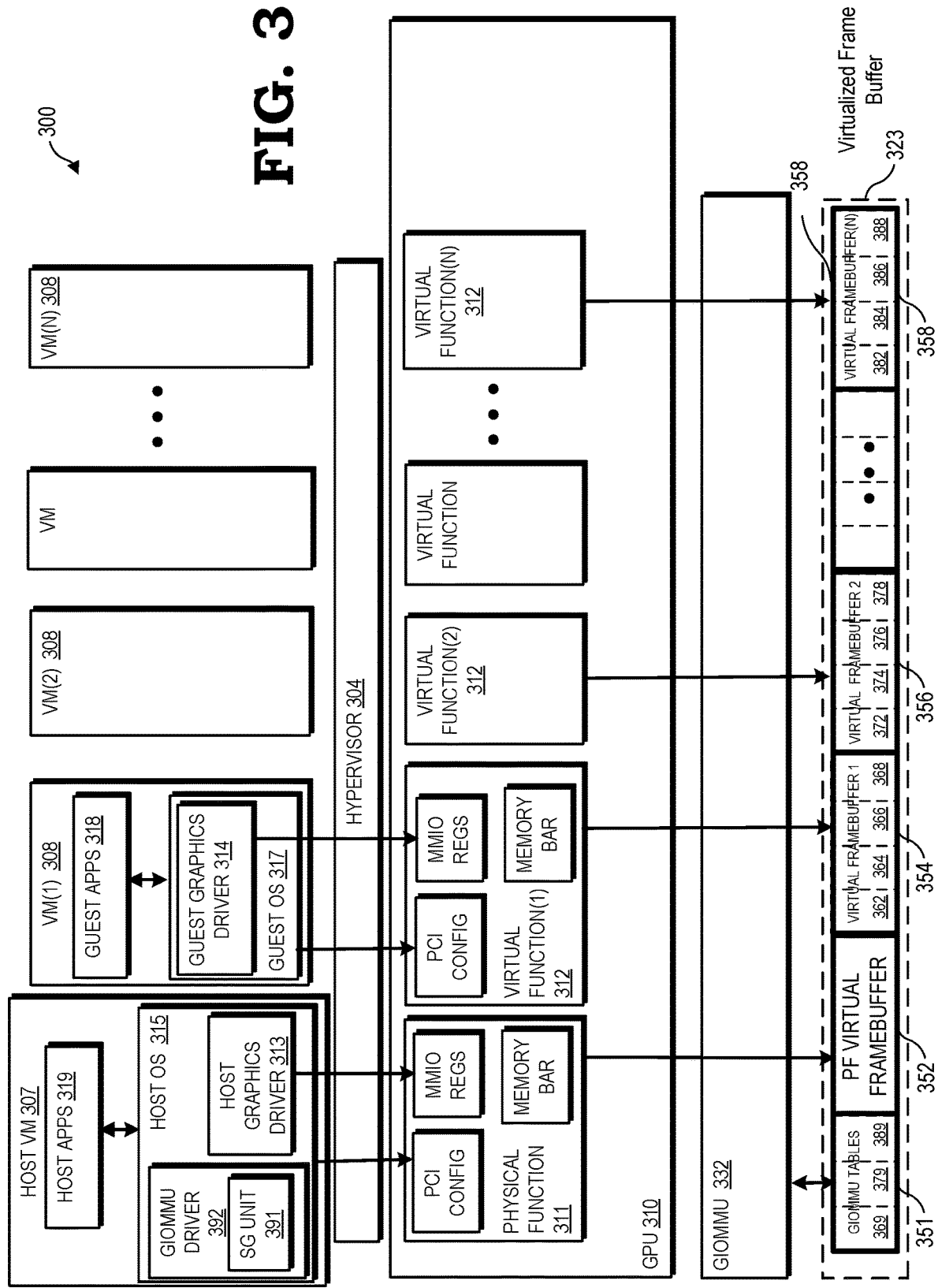
FIG. 3 is a block diagram illustrating a host system generating a virtual frame buffer in accordance with some embodiments.

FIG. 3 is a block diagram illustrating an embodiment of a host system 300 generating a virtual frame buffer in accordance with various embodiments. Host system 300 includes a host virtual machine (HVM) 307, virtual machines 308 (virtual machine (1) 308 through virtual machine(N) 308), a hypervisor 304, a GPU 310, a graphics input/output memory management unit (GIOMMU) 332, and a virtualized frame buffer 323. GPU 310 includes a physical function 311 and virtual functions 312 (virtual function (1) 312 through virtual function (N) 312). Virtualized frame buffer 323 includes graphics input/output memory management unit (GIOMMU) tables 351, a physical function virtual frame buffer 352, a virtual frame buffer 354, a virtual frame buffer 354, and a virtual frame buffer 356 through virtual frame buffer 358. Virtual frame buffer 354 includes a page 362, a page 364, a page 366 (hereinafter pages 362-366), and a page table 369. Virtual frame buffer 356 includes a page 372, a page 374, a page 376 (hereinafter pages 372-376), and a page table 379. Virtual frame buffer 358 includes a page 382, a page 384, a page 386 (hereinafter pages 372-376), and a page table 388. In various embodiments, page tables 369, 379, and 389 may be instances of, for example, page table 241, where page table 241 is replicated for each virtual frame buffer 354-358.

In FIG. 3, host virtual machine 307 is assigned the resources of physical function 311 by hypervisor 304. Host virtual machine 307 includes applications 319 and a host operating system 315. Host operating system 315 includes a host graphics driver 313 and a graphics input/output memory management unit (GIOMMU) driver 392. GIOMMU driver 392 includes a scatter gather (SG) unit 391. Host operating system 315 and host graphics driver 313 interact directly with physical function 311. Host virtual machine 307 discovers, manages, and configures physical function 311 as though it were a normal PCIe device. Hypervisor 304 includes software that configures and manages virtual machines 308. Virtual machine (1) 308 is assigned the resources of virtual function (1) 312 by hypervisor 304. Virtual machine (1) 308 includes a guest operating system 317, guest applications 318, and a guest graphics driver 314. Additionally, virtual function (1) 312 is assigned a device configuration by hypervisor 304. Guest operating system 317 and guest graphics driver 314 use the device configuration to access virtual function (1) 312. After configuration, guest operating system 317 and guest graphics driver 314 bypass hypervisor 304 and interact directly with virtual function (1) 312 when processing any type of I/O requests. In various embodiments, guest graphics driver 314 is identical, or nearly identical, to host graphics driver 313 running on the host virtual machine 307. Thus, guest graphics driver 314 in virtual machine (1) 308 is a full function driver providing access to the entire functionality of GPU 310.

The underlying rendering and drawing functionality provided by GPU 310 is shared among physical function 311 and its associated virtual functions 312. However, each virtual function of virtual functions 312 has its own independent set of resources including register address map and memory address map. In particular, virtual function (1) 312(1) is configured to have a separate virtual frame buffer segment (e.g., virtual function frame 354, virtual function frame 356) that combined make up virtualized frame buffer 323.

As depicted in FIG. 3, with reference to FIG. 2, in addition to the GIOMMU tables 351 and physical function virtual frame buffer 352, virtual frame buffers 354-358 are generated in virtualized frame buffer 323 for virtual functions 312 in the SR-IOV virtualization environment. The process commences with the instantiation of virtual functions 312, at which point the allotted amount of memory space of frame buffer 222 for each virtual function is allocated, as described previously above with reference to FIGS. 1 and 2. For example, during instantiation of virtual function (1) 312, GIOMMU driver 392 gathers a plurality of available pages which may be scattered throughout system physical memory of the frame buffer and maps them into a contiguous guest physical address range. The pages are virtually concatenated into a virtual frame buffer (virtual frame buffer 354, virtual frame buffer 356, and virtual frame buffer 358) that, together with other virtual frame buffers, GIOMMU tables 351, and PF virtual frame buffer 352, yield a virtualized frame buffer 323. In one embodiment, the virtualized frame buffer 323 is composed of a plurality of virtual frame buffers, in addition to instances of the GIOMMU page tables 241 (i.e., page tables 369, 379, and 389) mapping the virtual frame buffer pages into system physical memory. Each resulting virtual frame buffer appears as a contiguous frame buffer to the virtual machine accessing the frame buffer.

In an alternate embodiment, during instantiation of virtual function (1) 312, graphics engine 209 issues a memory access request to the frame buffer 222 for read or write operations. Based on the physical address received during the memory access request, the pages of the memory space in the frame buffer 222 that correspond to the range of virtual addresses are gathered in frame buffer 222. The pages are virtually concatenated into a virtual frame buffer that, together with other virtual frame buffers, yield a virtualized frame buffer 323. That is, the virtualized frame buffer 323 is composed of a plurality of virtual frame buffers, in addition to instances of the GIOMMU page tables, i.e., page tables 369, 379, and 389 mapping the virtual frame buffer pages into system physical memory. Each resulting virtual frame buffer appears as a contiguous frame buffer to the virtual machine that made the memory access request.

In one embodiment, for example, with reference to FIGS. 2 and 3, upon instantiation of virtual function (1) 312, scatter gather unit 391 maps a plurality of pages of size, for example, 256 MB into a contiguous region of guest physical memory based on the amount of memory requested to be allocated to the VF. The pages may be scattered throughout system physical frame buffer memory. When virtual machine (1) 308 issues a memory access request directed to frame buffer 222, GIOMMU 232 gathers a plurality of pages whose combined size equals 1 GB. In this example, GIOMMU 232 gathers four pages (pages 362-368) to yield the requested 1 GB memory space of frame buffer 222. Because GIOMMU 232 has kept track of the location of each page of the 1000 pages using page table 240, the pages are provided in a virtually concatenated order by GIOMMU 232 to make up the virtual frame 354 of virtual frame buffer 323.

Figure 4:
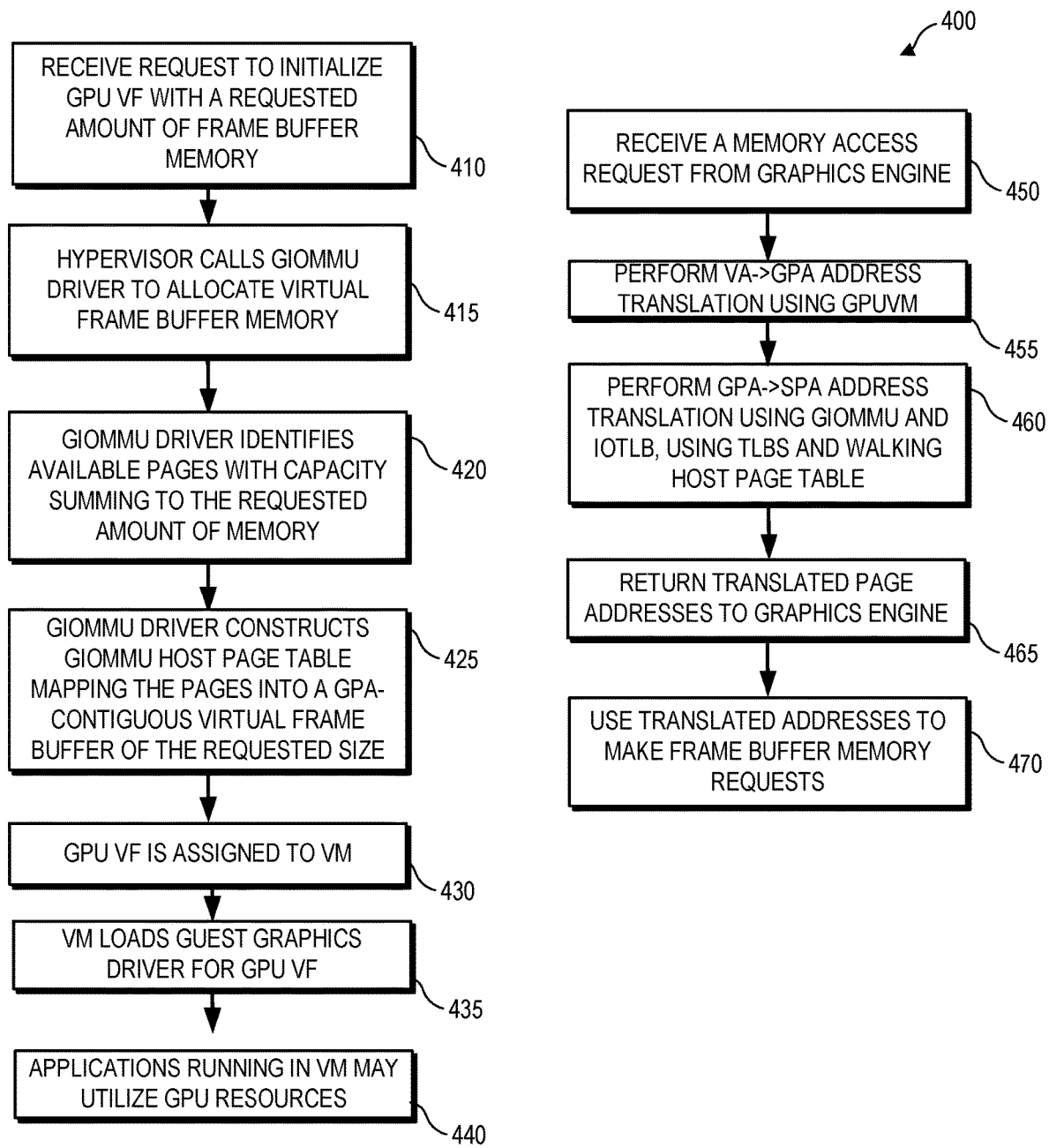
FIG. 4 is a flow diagram illustrating an example method for generating a virtual frame buffer in accordance with some embodiments.

FIG. 4 is a flow diagram illustrating a method 400 for generating a virtual frame buffer according to various embodiments. With reference to FIG. 2, in block 410, a request is received to initialize VFs 212 with a requested amount of memory from frame buffer 222. In block 415, a hypervisor calls GIOMMU driver 292 to allocate virtual frame buffer memory. In block 420, GIOMMU driver 292 identifies pages that are available with the appropriate capacity that sum up to the requested amount of memory. In block 425, GIOMMU driver 292 constructs an IOMMU host page table mapping the available pages into a GPA-contiguous virtual frame buffer of the requested size. In block 430, a VF 212 is assigned to a VM 208. In block 435, VM 208 loads guest graphics driver for VF 212. In block 440, applications running in VM 208 may utilize GPU 210 resources. In block 450, a memory access request is received from graphics engine 209. In block 455, a virtual address to guest physical address translation is performed using GPUVM 224. In block 460, a guest physical address to system physical address translation is performed with GIOMMU 232 and IOTLB 220 using TLBs and walking the host page table. In block 465, the translated page addresses are returned to graphics engine 209. In block 470, the translated addresses are used to make requests to the frame buffer 222. In various embodiments, when a request is made to frame buffer 222, the resulting virtual frame buffer appears as a contiguous frame buffer to the virtual machine that made the memory access request.

While various embodiments described above have been depicted in terms of a GPU and an associated framebuffer memory, the techniques described herein can be generalized to any input/output (I/O) device with on-board memory. In various embodiments, an input/output (I/O) device may be configured to operate using at least one of a single-root input/output virtualization (SR-IOV) and a scalable input/output virtualization (S-IOV), such as, for example, an Intel Scalable Input/Output Virtualization from the Intel Scalable Input/Output Virtualization specification. In some embodiments, the apparatus and techniques described above are implemented in a system including one or more integrated circuit (IC) devices (also referred to as integrated circuit packages or microchips), such as the processing system described above with reference to FIGS. 1-4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
receiving a request from one or more virtual machines for allocation of a memory space from a frame buffer;
identifying a plurality of pages from the frame buffer that are available to fulfill the request, the plurality of pages representing non-contiguous portions of the frame buffer;
generating a virtual frame buffer using the plurality of pages based on a scatter-gather mapping operation; and
fulfilling the request by representing the plurality of pages to the one or more virtual machines as contiguous memory via the generated virtual frame buffer.

2. The method of claim 1, wherein:
generating the virtual frame buffer includes constructing a page table mapping the plurality of pages into the virtual frame buffer.

3. The method of claim 2, wherein:
the plurality of pages are a plurality of host pages and the page table is a graphics input/output memory management unit (GIOMMU) host page table.

4. The method of claim 3, wherein:
constructing the GIOMMU host page table mapping the plurality of host pages into the virtual frame buffer includes mapping the plurality of host pages into a guest physical address (GPA) contiguous virtual frame buffer.

5. The method of claim 1, wherein:
the plurality of pages are scattered throughout the frame buffer.

6. The method of claim 1, further comprising:
receiving a request to initialize a virtual function of a graphics processing unit (GPU).

7. The method of claim 1, further comprising:
calling a graphics input/output memory management unit (GIOMMU) driver to allocate at least a portion of the memory space of the virtual frame buffer.

8. The method of claim 1, further comprising:
receiving a memory access request to access the memory space;
requesting, via a translation request, a translation of a virtual address to a physical address from an input/output translation look-aside buffer (IOTLB); and
requesting a translation of a guest physical address to a system physical address.

9. The method of claim 8, further comprising:
using the physical address provided from the IOTLB to trigger the memory access request to the memory space of the frame buffer.

10. The method of claim 8, wherein:
the IOTLB is a modified Address Translation Cache (ATC), wherein the modified ATC is able to discern a difference between a system memory and a frame buffer memory.

11. The method of claim 7, wherein:
a graphics input/output memory management unit (GIOMMU) is controlled by a hypervisor or a host operating system.

12. An apparatus, comprising:
a graphics processing unit (GPU); and
a frame buffer coupled to the GPU;
wherein, based upon initialization of a virtual function, the GPU:
generates a virtual frame buffer using a scatter-gather mapping operation to map
one or more of a plurality of non-contiguous pages of the frame buffer into the virtual frame buffer, and
represents the virtual frame buffer to a virtual machine as contiguous memory.

13. The apparatus of claim 12, wherein:
the plurality of non-contiguous pages are mapped into the virtual frame buffer by using a graphics input/output memory management unit (GIOMMU) and an associated page table.

14. The apparatus of claim 13, wherein:
the associated page table is a graphics input/output memory management unit (GIOMMU) page table and a virtual function guest physical memory request is mapped to a corresponding system physical address using the GIOMMU and the GIOMMU page table.

15. The apparatus of claim 14, wherein:
a physical location of the plurality of non-contiguous pages is annotated in a page table located in the frame buffer.

16. The apparatus of claim 15, wherein:
a translation of a virtual address is requested using a translation request from an IOTLB.

17. The apparatus of claim 16, wherein:
the IOTLB is a modified Address Translation Cache (ATC), wherein the modified ATC is able to discern a difference between a system memory and a frame buffer memory.

18. A processing system, comprising:
an input/output (I/O) device configured to operate using at least one of a single-root input/output virtualization (SR-IOV) and a scalable input/output virtualization (S-IOV); and
a plurality of virtual machines configured to utilize a local memory, wherein based upon a request for an allocation of memory for a virtual function, a plurality of pages are gathered to generate a virtual frame buffer based on a scatter-gather mapping operation, are non-contiguous portions of the frame buffer, and are represented to a virtual machine as contiguous memory.

19. The processing system of claim 18, wherein:
in order to generate the local memory, the plurality of pages are mapped into a contiguous region of guest physical memory using a graphics input/output memory management unit (GIOMMU).

20. The processing system of claim 19, wherein:
the GIOMMU is controlled by a hypervisor or a host operating system.

* * * * *